T. H. DEPEW.
SHOE FOR TIRES.
APPLICATION FILED MAY 3, 1917.

1,264,903.

Patented May 7, 1918.

INVENTOR:
THOMAS H. DEPEW
by Ralph Donath & J.R. Snyder
his Attorneys

UNITED STATES PATENT OFFICE.

THOMAS H. DEPEW, OF PITTSBURGH, PENNSYLVANIA.

SHOE FOR TIRES.

1,264,903.  Specification of Letters Patent.  Patented May 7, 1918.

Application filed May 3, 1917. Serial No. 166,254.

*To all whom it may concern:*

Be it known that I, THOMAS H. DEPEW, a citizen of the United States, residing at Pittsburgh, in the county of Allegheny and State of Pennsylvania, have invented certain new and useful Improvements in Shoes for Tires, of which the following is a specification.

This invention relates to a shoe for pneumatic tires whereby the life of a tire may be prolonged and has for its primary object to provide a construction wherein the parts are so arranged and constructed that better gripping action may be accomplished between the shoe and the tire.

Another object of the invention is the novel manner of shaping and locating the annulus relative to the grooves in the body so that the annulus will be effectively anchored in the body and the latter materially reinforced by the former.

With these and other objects in view the invention will be better understood from the following detail description taken in connection with the accompanying drawing wherein:—

Figure 1:
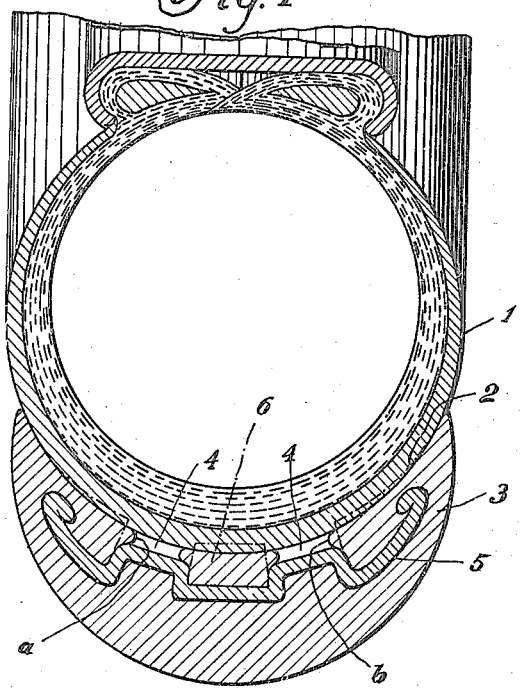
Figure 1 is a sectional view of the tire showing my invention applied thereto.
Figure 2:
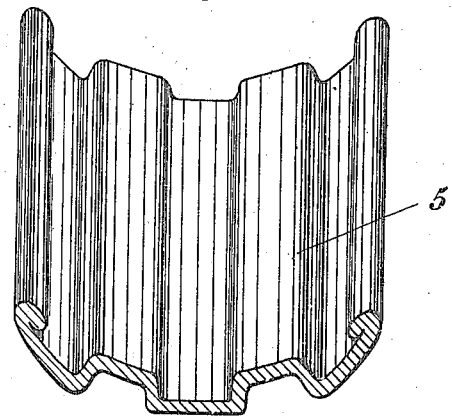
Fig. 2 is a fragmentary perspective view of the annulus.

In the drawing, the numeral 1 designates a pneumatic tire, the tread portion of which is embraced by the concave side 2 of a resilient body 3, crescent shape in cross section, although the body may be of any other suitable shape in cross section.

The body upon its concave side is provided with a circumferential extending groove of varying depths shown in this particular instance as of step formation.

Embedded in the body is an annulus 5 ribbed in a longitudinal direction so as to conform to, and lie flat upon the bottom of the groove as clearly shown in Fig. 1 of the drawing.

Embraced by the ribs of the annulus centrally of the groove 4 is a strip or ring of resilient material 6, extending beyond the adjacent surface of the annulus so that when air is forced into the tire the expansible action thereof will squeeze the ring 6 and cause the same to overlap other portions of the annulus as clearly shown in Fig. 1.

A very important feature of my invention is that this expansible action of the tire causes other portions $a$ and $b$ of the body to be squeezed out of shape, with the result that a better grip is accomplished between the concave side of the body 3 and the tread portion of the tire.

From the foregoing description taken in connection with the accompanying drawing it should be apparent that I provide a shoe construction of a very substantial formation in which the parts are so related that the gripping action between the shoe and the tread of the tire is materially increased for preventing circumferential as well as lateral movement of the shoe upon the tire.

What I claim as new and desire to secure by Letters Patent is:—

A tire shoe comprising a resilient body, a metallic annulus embedded therein and formed with circumferential corrugations embedded in the body with the corrugations in a position spaced from adjacent portions of the body, and a ring of a thickness greater than the ribs and supported thereby.

In testimony whereof I affix my signature in the presence of two witnesses.

THOMAS H. DEPEW.

Witnesses:
JENNIE JONES,
W. R. SMITH.

Copies of this patent may be obtained for five cents each, by addressing the "Commissioner of Patents, Washington, D. C."